Patented Oct. 3, 1922.

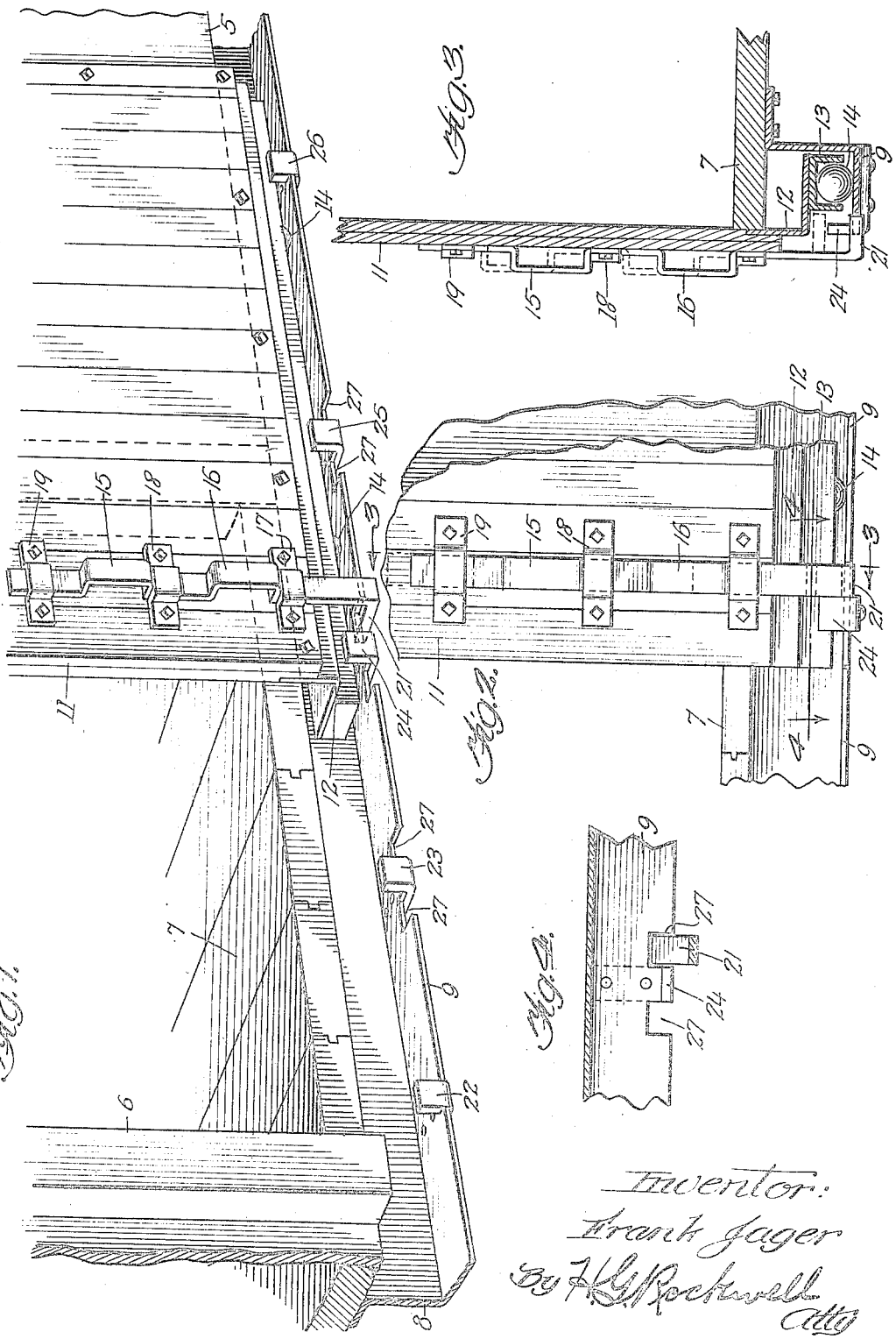

1,430,555

UNITED STATES PATENT OFFICE.

FRANK JAGER, OF CHICAGO, ILLINOIS.

CAR-DOOR CONSTRUCTION.

Application filed September 9, 1920. Serial No. 409,078.

*To all whom it may concern:*

Be it known that I, FRANK JAGER, a citizen of the United States, residing at Chicago, in the county of Cook and State of Illinois, have invented certain new and useful Improvements in Car-Door Constructions, of which the following is a specification.

This invention relates in general to car doors of the type which are slidable longitudinally of the car, and are designed more particularly for use on freight cars, my present invention having more especial reference to provisions for locking said door and preventing the same from sliding and banging and from accidental opening or closing. My improved door being mounted on roller bearings, slides very easily in its opening and closing movements, and consequently, is subject to destructive slamming, particularly in the yards where the cars are bumped and jerked in switching. Furthermore, accidental opening or closing of the door is liable to injure workmen who may be partially disposed in the door opening.

My present invention has for its primary object the provision of means whereby destructive or accidental slamming of the door is prevented, and with this end in view, my invention is designed to automatically stop the door before it is moved an appreciable distance in either direction and to automatically lock the door in its stopped position so that further movement of the door in either direction is precluded until the lock or latch is manually released.

Another object of my invention is to provide a door lock which is accessible for manipulation both by an operator standing on the ground alongside the car or by one standing on a track or platform substantially level with the car floor so that the door may be unlocked from either position without the use of poles, bars or other tools whatsoever.

Other objects and advantages of my invention will be readily appreciated as the same becomes better understood by reference to the following description when considered in connection with the accompanying drawings, upon which a preferred embodiment of the invention is shown for purposes of illustration.

Referring to the drawings:

Fig. 1 is a fragmentary view in perspective of a car door equipped with my invention;

Fig. 2 is a fragmentary elevation showing the lock disclosed in Fig. 1;

Fig. 3 is a transverse sectional view taken substantially on the line 3—3 of Fig. 2; and Fig. 4 is a horizontal sectional view on the line 4—4 of Fig. 2.

On the drawings, reference character 5 indicates generally the side wall of a freight car provided with the usual door opening, which is equipped at the sides with the customary door posts 6, one of which is shown in Fig. 1. The floor 7 of the car is carried by the usual sills (not shown) and beneath the car structure proper and attached either to the floor or preferably to the side sills of the car, is disposed a door supporting track indicated generally by reference character 8. This track may be of either angle-bar construction or preferably Z-bar construction, as shown, depending upon the structure of the car body parts to which the track is to be attached. In either event, the track structure provides a horizontal flange 9 upon which the car door is adapted to be supported, and along which it travels in its opening and closing movements.

The door, designated generally by reference character 11, is of usual flat construction, preferably comprising two thicknesses of boards, and at its lower edge, it is equipped with an angle-bar 12, upon the lower face of the horizontal flange of which is mounted a suitable ball retainer 13, between which and the underlying supporting flange 9 of the track are disposed a plurality of anti-friction balls 14. By this construction, a ball bearing is provided which carries the weight of the door and enables it to slide freely back and forth in its opening and closing movements, the top of the door being, of course, guided by any suitable structure (not shown).

For the purpose of locking the door in open, closed, or intermediate positions, I have mounted upon the outer face of the door, a locking bar bent to provide outwardly projecting upper and lower handles 15 and 16 respectively, the bar being secured to the door so as to be capable of vertical sliding movement by means of a series of embracing clips 17, 18 and 19, the upward movement of the bar being limited by engagement of the top of the handle 15 with the clip 19 and downward movement being limited by engagement of the bottom of the handle 16 with the clip 17, as shown in Figs. 1 and 2. The lower end of the locking bar is preferably bent laterally, as shown at 21, and is adapted to rest upon the upper surface of the supporting track flange 9.

For the purpose of limiting longitudinal sliding movements of the door, the track is provided at spaced intervals with upwardly projecting abutments, designated by 22, 23, 24, 25 and 26. As the door moves longitudinally, these abutments being disposed in the path of travel of the lower end of the locking bar, one of them is engaged by the locking bar, thus limiting further movement of the door in that direction. The front abutment 22 and the rear abutment 26 are so positioned that when the locking bar is engaged in front of the abutment 22, the door is locked in closed position, and when engaged behind the abutment 26, the door is locked in open position. Closing movement of the door is of course limited by the door post 6 and opening movement by suitable stop means, (not shown) which may be of any well known or preferred construction.

If the upwardly projecting abutments alone were relied upon, the door, while incapable of any considerable longitudinal movement, might nevertheless slide back and forth between the two adjacent abutments, and to preclude such limited accidental movements of the door, I have made provision for positively locking the door against any longitudinal movement whatsoever whenever the locking bar strikes against any of the intermediate abutments. This provision consists of a pair of recesses 27 disposed in proximity to these abutments, the recesses of each pair being disposed on opposite sides of their respective abutments. For economy in manufacture, these recesses consist merely in slots cut in the outer edge of the track flange 9. Since the locking bar is capable of downward movement to a point beneath the plane of the upper surface of the track flange 9, it will be manifest that whenever the door in its movements brings the end 21 of the locking bar into engagement with one of the intermediate abutments, the door will not only be stopped against further movement in that direction but the locking bar will immediately drop into the recess or cut-away portion of the track into the position shown on the drawings, whereupon further movement of the door in either direction is precluded. The door will therefore remain locked in this position until the locking bar is manually lifted clear of the recess, whereupon the door may be moved in one direction to the next abutment, but should it be desirable to move the door in the opposite direction or beyond the next abutment, the locking bar is lifted still further into the position shown in dotted lines in Fig. 3 so that it clears the upper ends of all of the abutments, thus permitting the door to be moved to any desired position either fully closed or fully opened, or to any position intermediate thereof. It will be apparent that in whatever position the door is left, it will automatically lock itself before it is moved any appreciable distance, and consequently, destructive slamming of the door or injury to any one working around the car or in the doorway, is obviated.

The spaced handles 15 and 16 of the locking bar are so disposed that the lower handle 16 is in accessible position to any one standing on the ground alongside the car and the upper handle 15 is accessible to one standing on a truck or platform on a level with the car floor. By providing these two handles, one disposed above the other, the door may be easily unlocked either from the ground or from the platform without the use of poles or other means with which to reach the locking bars.

It is believed that my invention and many of its inherent advantages will be understood and appreciated from the foregoing without further description, and while I have shown and described a preferred embodiment of my invention, it should be obvious that the structural details thereof are capable of wide modification and variation without departing from the spirit of the invention as defined in the following claims.

I claim:

1. In a car construction, the combination of a track, a door slidably supported thereon, a locking member carried by said door, means cooperating with said locking member for automatically stopping said door at a plurality of predetermined points in its path of travel, and means also cooperating with said locking member for locking the door against movement at such points.

2. In a car construction, the combination of a track, a door slidably mounted thereon, said track being provided with a plurality of pairs of spaced locking recesses and a series of upwardly projecting abutments disposed between and adjacent to the recesses of each pair, and a locking bar carried by said door in position to engage with one of said abutments upon movement of the door and to lockingly engage in an adjacent recess when the door has been stopped by said abutment.

3. In a car construction, the combination of a track, a door slidably mounted thereon, a locking bar slidably carried by said door and projecting downwardly therefrom, a plurality of abutments disposed in the path of travel of said bar whereby the door is stopped after limited movement in either direction, and means co-operable with said bar when the door has been stopped, to lock said door against movement in either direction.

FRANK JAGER.